United States Patent
Baird et al.

(10) Patent No.: US 7,594,187 B2
(45) Date of Patent: *Sep. 22, 2009

(54) BOOKMARKING AND PLACEMARKING A DISPLAYED DOCUMENT IN A COMPUTER SYSTEM

(75) Inventors: Andrew C. Baird, Kirkland, WA (US); John L. Beezer, Redmond, WA (US); Jonathan C. Cluts, Redmond, WA (US); Darryl E. Rubin, Redmond, WA (US); Susan D. Woolf, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 398 days.

This patent is subject to a terminal disclaimer.

(21) Appl. No.: 10/871,092

(22) Filed: Jun. 21, 2004

(65) Prior Publication Data

US 2004/0236774 A1 Nov. 25, 2004

Related U.S. Application Data

(63) Continuation of application No. 09/456,127, filed on Dec. 7, 1999, now Pat. No. 6,992,687.

(51) Int. Cl.
*G06K 15/00* (2006.01)
(52) U.S. Cl. .................. 715/805; 715/776; 715/747
(58) Field of Classification Search .......... 715/802, 715/805, 772, 801, 804, 853–855, 806–807
See application file for complete search history.

(56) References Cited

U.S. PATENT DOCUMENTS 5,146,552 A * 9/1992 Cassorla et al. ............. 715/512

(Continued)

FOREIGN PATENT DOCUMENTS

EP 0342838 A 11/1989

(Continued)

OTHER PUBLICATIONS

Landay et al., "Making Sharing Pervasive: Ubiquitous Computing for Shared Note Taking," IBM Systems Journal, vol. 38, No. 4, 1999, pp. 531-550.

(Continued)

*Primary Examiner*—Steven P Sax
(74) *Attorney, Agent, or Firm*—Birch, Stewart, Kolasch & Birch, LLP (57) ABSTRACT

While viewing an electronically displayed document, a user creates a bookmark by selecting a desired part of a document to be marked. In response, a visual indicator is displayed and a bookmark object is created preferably separate from the document. The bookmark object comprises information linking the bookmark object to the desired part of the document as well as user-modifiable properties. If another part of the document is subsequently displayed, at least a portion of the visual indicator is still displayed. Later selection of the portion of the visual indicator causes the desired portion of the document to be re-displayed. Because the object is separate from the document, it may be viewed and sorted by its properties apart from its display with the document. A placemark is created whenever the display of a current document is discontinued. In response to a discontinuation signal, a placemark object comprising information linking the placemark object to a last-viewed part of the document is created. Subsequent selection of the document for re-display causes the last-viewed part of the document to be displayed.

14 Claims, 8 Drawing Sheets

U.S. PATENT DOCUMENTS

| | | | |
|---|---|---|---|
| 5,237,648 A | 8/1993 | Mills et al. | |
| 5,239,466 A | 8/1993 | Morgan et al. | |
| RE34,476 E | 12/1993 | Norwood | |
| 5,347,295 A | 9/1994 | Agulnick et al. | |
| 5,390,138 A | 2/1995 | Milne et al. | |
| 5,434,929 A | 7/1995 | Beernink et al. | |
| 5,434,965 A | 7/1995 | Matheny et al. | |
| 5,471,568 A | 11/1995 | Webb et al. | |
| 5,559,942 A | 9/1996 | Gough et al. | |
| 5,572,643 A | 11/1996 | Judson | |
| 5,623,679 A | 4/1997 | Rivette et al. | |
| 5,625,833 A | 4/1997 | Levine et al. | |
| 5,630,125 A * | 5/1997 | Zellweger | 707/103 R |
| 5,632,022 A | 5/1997 | Warren et al. | |
| 5,644,674 A | 7/1997 | Aihara et al. | |
| 5,666,113 A | 9/1997 | Logan | |
| 5,680,636 A | 10/1997 | Levine et al. | |
| 5,682,439 A | 10/1997 | Beernink et al. | |
| 5,687,331 A | 11/1997 | Volk et al. | |
| 5,689,717 A | 11/1997 | Pritt | |
| 5,717,860 A | 2/1998 | Graber et al. | |
| 5,717,879 A | 2/1998 | Moran et al. | |
| 5,719,595 A | 2/1998 | Hoddie et al. | |
| 5,727,129 A | 3/1998 | Barrett et al. | |
| 5,729,687 A | 3/1998 | Rothrock et al. | |
| 5,737,599 A | 4/1998 | Rowe et al. | |
| 5,745,116 A | 4/1998 | Pisutha-Arnond | |
| 5,760,773 A | 6/1998 | Berman et al. | |
| 5,761,485 A | 6/1998 | Munyan | |
| 5,761,683 A | 6/1998 | Logan et al. | |
| 5,784,058 A | 7/1998 | LaStrange et al. | |
| 5,786,814 A | 7/1998 | Moran et al. | |
| 5,790,818 A | 8/1998 | Martin | |
| 5,801,685 A | 9/1998 | Miller et al. | |
| 5,801,687 A | 9/1998 | Peterson et al. | |
| 5,802,516 A | 9/1998 | Shwarts et al. | |
| 5,819,301 A | 10/1998 | Rowe et al. | |
| 5,821,925 A | 10/1998 | Carey et al. | |
| 5,822,720 A | 10/1998 | Bookman et al. | |
| 5,826,025 A | 10/1998 | Gramlich | |
| 5,832,263 A | 11/1998 | Hansen et al. | |
| 5,835,092 A | 11/1998 | Boudreau et al. | |
| 5,838,313 A | 11/1998 | Hou et al. | |
| 5,838,914 A | 11/1998 | Carleton et al. | |
| 5,845,262 A | 12/1998 | Nozue et al. | |
| 5,854,630 A | 12/1998 | Nielsen | |
| 5,860,074 A | 1/1999 | Rowe et al. | |
| 5,862,395 A * | 1/1999 | Bier | 712/1 |
| 5,877,757 A | 3/1999 | Baldwin et al. | |
| 5,893,126 A | 4/1999 | Drews et al. | |
| 5,893,132 A | 4/1999 | Huffman et al. | |
| 5,918,236 A | 6/1999 | Wical | |
| 5,920,694 A | 7/1999 | Carleton et al. | |
| 5,923,326 A | 7/1999 | Bittinger et al. | |
| 5,924,104 A | 7/1999 | Earl | |
| 5,931,912 A | 8/1999 | Wu et al. | |
| 5,933,139 A | 8/1999 | Feigner et al. | |
| 5,933,140 A | 8/1999 | Strahorn et al. | |
| 5,937,416 A | 8/1999 | Menzel | |
| 5,940,080 A | 8/1999 | Ruehle et al. | |
| 5,948,040 A | 9/1999 | DeLorme et al. | |
| 5,950,214 A | 9/1999 | Rivette et al. | |
| 5,956,034 A | 9/1999 | Sachs et al. | |
| 5,978,818 A | 11/1999 | Lin | |
| 5,982,370 A | 11/1999 | Kamper | |
| 5,983,248 A | 11/1999 | DeRose et al. | |
| 5,986,665 A | 11/1999 | Wrey et al. | |
| 6,011,537 A | 1/2000 | Slotznick | |
| 6,012,055 A | 1/2000 | Campbell et al. | |
| 6,018,334 A | 1/2000 | Eckerberg et al. | |
| 6,018,342 A | 1/2000 | Bristor | |
| 6,018,344 A | 1/2000 | Harada et al. | |
| 6,018,742 A | 1/2000 | Herbert, III | |
| 6,025,841 A | 2/2000 | Finkelstein et al. | |
| 6,034,689 A | 3/2000 | White et al. | |
| 6,035,330 A | 3/2000 | Astiz et al. | |
| 6,037,934 A | 3/2000 | Himmel et al. | |
| 6,038,598 A | 3/2000 | Danneels | |
| 6,049,812 A | 4/2000 | Bertram et al. | |
| 6,052,514 A | 4/2000 | Gill et al. | |
| 6,054,990 A | 4/2000 | Tran | |
| 6,055,538 A | 4/2000 | Kessenich et al. | |
| 6,064,384 A | 5/2000 | Ho | |
| 6,072,490 A | 6/2000 | Bates et al. | |
| 6,076,917 A | 6/2000 | Wen | |
| 6,081,829 A | 6/2000 | Sidana | |
| 6,091,930 A | 7/2000 | Mortimer et al. | |
| 6,094,197 A | 7/2000 | Buxton et al. | |
| 6,105,044 A | 8/2000 | DeRose et al. | |
| 6,122,649 A | 9/2000 | Kanerva et al. | |
| 6,133,925 A * | 10/2000 | Jaremko et al. | 345/441 |
| 6,141,007 A | 10/2000 | Lebling et al. | |
| 6,144,375 A | 11/2000 | Jain et al. | |
| 6,144,991 A | 11/2000 | England | |
| 6,151,622 A | 11/2000 | Fraenkel et al. | |
| 6,154,771 A | 11/2000 | Rangan et al. | |
| 6,157,381 A | 12/2000 | Bates et al. | |
| 6,163,778 A | 12/2000 | Fogg et al. | |
| 6,181,344 B1 | 1/2001 | Tarpenning et al. | |
| 6,184,886 B1 * | 2/2001 | Bates et al. | 715/760 |
| 6,195,679 B1 | 2/2001 | Bauersfeld et al. | |
| 6,195,694 B1 | 2/2001 | Chen et al. | |
| 6,199,082 B1 | 3/2001 | Ferrel et al. | |
| 6,205,419 B1 | 3/2001 | Fiedler | |
| 6,205,455 B1 | 3/2001 | Umen et al. | |
| 6,211,871 B1 * | 4/2001 | Himmel et al. | 715/744 |
| 6,226,655 B1 | 5/2001 | Borman et al. | |
| 6,230,171 B1 | 5/2001 | Pacifici et al. | |
| 6,243,071 B1 * | 6/2001 | Shwarts et al. | 715/823 |
| 6,243,091 B1 | 6/2001 | Berstis | |
| 6,266,772 B1 | 7/2001 | Suzuki | |
| 6,271,840 B1 | 8/2001 | Finseth et al. | |
| 6,272,484 B1 | 8/2001 | Martin et al. | |
| 6,279,005 B1 | 8/2001 | Zellweger | |
| 6,279,014 B1 | 8/2001 | Schilit et al. | |
| 6,289,126 B1 | 9/2001 | Ishisaka | |
| 6,289,362 B1 | 9/2001 | Van Der Meer | |
| 6,301,590 B1 | 10/2001 | Siow et al. | |
| 6,320,169 B1 | 11/2001 | Clothier | |
| 6,320,577 B1 | 11/2001 | Alexander | |
| 6,321,244 B1 | 11/2001 | Liu et al. | |
| 6,331,866 B1 | 12/2001 | Eisenberg | |
| 6,331,867 B1 | 12/2001 | Eberhard et al. | |
| 6,340,980 B1 | 1/2002 | Ho | |
| 6,356,287 B1 | 3/2002 | Ruberry et al. | |
| 6,369,811 B1 | 4/2002 | Graham et al. | |
| 6,370,497 B1 | 4/2002 | Knowles | |
| 6,377,983 B1 | 4/2002 | Cohen et al. | |
| 6,389,434 B1 | 5/2002 | Rivette et al. | |
| 6,393,422 B1 | 5/2002 | Wone | |
| 6,397,264 B1 | 5/2002 | Stasnick et al. | |
| 6,405,221 B1 | 6/2002 | Levine et al. | |
| 6,418,421 B1 | 7/2002 | Hurtado et al. | |
| 6,421,065 B1 | 7/2002 | Walden et al. | |
| 6,425,525 B1 * | 7/2002 | Swaminathan et al. | 235/385 |
| 6,437,793 B1 | 8/2002 | Kaasila | |
| 6,437,807 B1 | 8/2002 | Berquist et al. | |
| 6,446,110 B1 | 9/2002 | Lection et al. | |
| 6,457,013 B1 | 9/2002 | Saxton et al. | |
| 6,460,058 B2 | 10/2002 | Koppolu et al. | |
| 6,484,156 B1 * | 11/2002 | Gupta et al. | 707/1 |
| 6,486,895 B1 | 11/2002 | Robertson et al. | |
| 6,490,603 B1 | 12/2002 | Keenan et al. | |
| 6,529,920 B1 | 3/2003 | Arons et al. | |

| | | | |
|---|---|---|---|
| 6,535,294 B1 | 3/2003 | Arledge, Jr. et al. | |
| 6,539,370 B1 | 3/2003 | Chang et al. | |
| 6,549,220 B1 | 4/2003 | Hsu et al. | |
| 6,549,878 B1 | 4/2003 | Lowry et al. | |
| 6,560,621 B2 | 5/2003 | Barile | |
| 6,571,211 B1 | 5/2003 | Dwyer et al. | |
| 6,571,295 B1 | 5/2003 | Sidana | |
| 6,573,907 B1 | 6/2003 | Madrane | |
| 6,585,776 B1 | 7/2003 | Bates et al. | |
| 6,631,496 B1 | 10/2003 | Li et al. | |
| 6,636,238 B1 | 10/2003 | Amir et al. | |
| 6,647,534 B1 | 11/2003 | Graham | |
| 6,662,310 B2 | 12/2003 | Lopez et al. | |
| 6,687,878 B1 | 2/2004 | Eintracht et al. | |
| 6,697,997 B1 | 2/2004 | Fujimura | |
| 6,710,790 B1 | 3/2004 | Fagioli | |
| 6,714,214 B1 | 3/2004 | DeMello | |
| 6,760,884 B1 | 7/2004 | Vertelney et al. | |
| 6,772,139 B1 | 8/2004 | Smith | |
| 6,788,316 B1 | 9/2004 | Ma et al. | |
| 6,832,350 B1 * | 12/2004 | Bates et al. | 715/501.1 |
| 6,871,318 B1 | 3/2005 | Wynblatt et al. | |
| 6,904,450 B1 | 6/2005 | King et al. | |
| 6,992,687 B1 * | 1/2006 | Baird et al. | 715/805 |
| 2001/0031128 A1 | 10/2001 | Manbeck | |
| 2001/0044795 A1 * | 11/2001 | Cohen et al. | 707/5 |
| 2002/0097261 A1 | 7/2002 | Gottfurcht et al. | |
| 2002/0099552 A1 | 7/2002 | Rubin et al. | |
| 2002/0194260 A1 | 12/2002 | Headley et al. | |
| 2005/0005242 A1 * | 1/2005 | Hoyle | 715/745 |
| 2005/0060138 A1 | 3/2005 | Wang et al. | |

FOREIGN PATENT DOCUMENTS

| | | |
|---|---|---|
| EP | 0 822 501 A1 | 2/1998 |
| EP | 0 890 926 A1 | 1/1999 |
| EP | 0 902 379 A2 | 3/1999 |
| WO | WO 87/01481 | 3/1987 |
| WO | WO 96/20908 | 7/1996 |
| WO | WO 97 22109 A | 6/1997 |
| WO | WO 98/06054 | 2/1998 |
| WO | WO 98/09446 | 3/1998 |
| WO | WO 99/49383 | 9/1999 |

OTHER PUBLICATIONS

Landay, J. A., "Using Note-Taking Appliances for Student to Student Collaboration," 29th Annual Frontiers in Education Conference, IEEE Computer Society, Nov. 1999, p. Session 12C4/15-12C4/20.

C. Marshall, "Annotation from paper books to the digital library," ACM International Conf. on Digital Libraries, 1997, pp. 131-140.

"Joke eBook," Jul. 1998, PrimaSoft PC, Inc., Electronic Book Series Version 1.0, pp. 1-5.

D. Munyan, "Everybook, Inc: Developing the E-Book in Relation to Publishing Standards." Sep. 1998, http://www.futureprint.kent.edu/articles/munyan0.1htm, pp. 1-7.

PhotoImpact 3.0, Ulead Systems Inc., 1996.

Marshall, C., "Annotation from paper books to the digital library," ACM International Conf. on Digital Libraries, 1997, pp. 131-140.

Munyan, D., "Everybook, Inc: Developing the E-Book in Relation to Publishing Standards," Sep. 1998, http://www.futureprint.kent.edu/articles/munyan01.htm, pp. 1-7.

Greenberg, Saul, "A Fisheye Text Editor for Relaxed-WYSIWIS Groupware", Chi 1996 Proceedings, pp. 1 to 5.

Hirotsu et al. "Cmew/U—A Multimedia Web Annotation Sharing System", NTT Network Innovation Laboratories—Japan, IEEE, 1999, pp. 356-359.

Kuo et al., "A Synchronization Scheme for Multimedia Annotation", Multimedia Information Networking Laboratory, Tamkang University—Taiwan, IEEE, 1997, pp. 594-598.

"Hucklefine Defined", Apr. 1990, "http://www.ylem.org/artists/mmosher/huck.html", pp. 1-3.

"Tour of Korea Hypercard Stack", 1996, Grose Educational Media, "http://www.entrenet.com/~groedmed/kor2.html", pp. 1-2.

Bizweb2000.com—screenshots of an e-book, published on May 1999, pp. 1-4 "http://web.archive.org/web/*/http://www.bizweb2000.com/eshots.htm".

Schilit and Price: "Digital Library Information Appliances", ACM Conference on Digital Libraries, Jun. 23, 1992, pp. 217-226.

Graefe, et al: "Designing the muse: A Digital Music Stand for the Symphony Musician", Proc. of Conf on Human Factors in Computing Systems, Apr. 13-18, 1996, pp. 436-441.

Crespo, Chang, Bier: Computer Networks and ISDN Systems "Responsive interaction for a large Web application: the meteror shower architecture in the WebWriter II Editor", 1997, pp. 1508-1517.

Softbook® Press The Leader in Internet-Enabled Document Distribution and Reading Systems; http://www.softbook.com/consumer/reader.asp.

Rocket eBook Using the Rocket eBook; http://www.rocketbook.com/Products/Faq/using.html.

Explore the Features of the Rocket eBook; wysiwyg://212http://www.rocketbook.com/Products/Tour/index.html.

"Adobe Acrobat 3.0 Reader Online Guide", Adobe Systems, Inc., pp. 1-110.

Kunikazu, T., Patent Abstracts of Japan, Publication No. 11327789 for Color Display and Electronic Blackboard System, published Nov. 30, 1999.

Open eBook Forum, Open eBook™ Publication Structure 1.0, http://www.ebxwg.org/oebps1.0/download/oeb1-oebps.htm.

Kristensen, A., "Formsheets and the XML Forms Language" (Mar. 1999).

Dublin Core Resource Types: Structurality Draft: Jul. 24, 1997, Feb. 27, 1998.

Dublin Core Metadata Element Set, Version 1.1: Reference Description 1999.

Dublin Core Metadata Initiative: User Guide Working Draft Jul. 31, 1998, 1999.

* cited by examiner

BOOKMARKING AND PLACEMARKING A DISPLAYED DOCUMENT IN A COMPUTER SYSTEM

This application is a continuation of and claims priority from allowed application Ser. No. 09/456,127, filed Dec. 7, 1999.

TECHNICAL FIELD

The present invention relates generally to the electronic display of documents and, in particular, to the use of bookmarks and placemarks in electronically displayed documents.

BACKGROUND OF THE INVENTION

Many factors today drive the development of computers and computer software. One of these factors is the desire to provide accessibility to information virtually anytime and anywhere. The proliferation of notebook computers, personal digital assistants (PDAs) and other personal electronic devices reflect the fact that users want to be able to access information wherever they may be, whenever they want. In order to facilitate greater levels of information accessibility, the presentation of information must be made as familiar and comfortable as possible.

In this vein, one way to foster success of electronic presentations of information will be to allow users to handle information in a familiar manner. Stated another way, the use and manipulation of electronically-presented information may mimic those paradigms that users are most familiar with, e.g., printed documents, as an initial invitation to their use. As a result, greater familiarity between users and their "machines" will be engendered, thereby fostering greater accessibility, even if their capabilities are richer and more extensive than what the user is already familiar with. Once users feel comfortable with new electronic presentations, they will be more likely to take advantage of an entire spectrum of available functionality.

One manner of encouraging familiarity is to present information in an electronic book format in which a computer displays information in a manner that closely resembles printed books. In order to more completely mimic a printed book, users will need to have the ability to mark pages in a manner similar to today. Users will want to mark certain pages so that they can return to them later, i.e., to create bookmarks. Additionally, users will want to mark pages where they last left off reading a book, i.e., to create placemarks.

Current technology fails to accurately reproduce the use of bookmarks and placemarks as known in printed books. For example, the "NETSCAPE NAVIGATOR" web browser provides a function called "Bookmarks" that allows a user to store the identity of a given web page for later recall. The "INTERNET EXPLORER" web browser provides a similar function called "Favorites". However, these functions only provide the ability to return to a given web page that will typically comprise a substantial amount of information that cannot be viewed on a single computer screen. As a result, the user must scroll down the web page to access a certain part of the web page. Furthermore, the "bookmarks" provided in this manner are not visually represented in conjunction with the "documents" that they mark.

Additionally, word processing software is known to provide marking ability. For example, "WORDPERFECT" word processor software allows a user to insert a "bookmark" into a document. The user can later select the bookmark from a list of bookmarks and have the display return to the point in the document where the bookmark was inserted. Again, however, this method of bookmarking fails to provide any visual indicator along with the document itself.

Finally, "EXCEL" spreadsheets are known to provide visible "tabs" which uniquely identify various "sheets" within a file. However, the location and appearance of these tabs is not controllable by the user.

Thus, it would be advantageous to provide a technique for creating, using and removing bookmarks and placemarks in electronic documents. Such a technique should provide a visual indicator where appropriate and should provide flexibility in defining parameters that control the marks.

SUMMARY OF THE INVENTION

The present invention provides a technique for bookmarking and/or placemarking an electronic document. In the context of the present invention, a "document" encompasses all forms of electronically displayable information that require more than a single screen to be fully displayed. To create a bookmark, a user selects a desired part of a document to be marked. In response to the user's selection, a visual indicator is displayed along with the desired part of the document. Concurrently, a bookmark object is preferably created in a user space apart from the document being bookmarked. The bookmark object comprises information linking the bookmark object to the desired part of the document. Additionally, the bookmark object comprises user-modifiable display, labeling and other properties that control the manner in which the visual indicator behaves. If another part of the document is subsequently displayed in place of the desired part of the document, at least a portion of the visual indicator is still displayed. Later selection of the portion of the visual indicator will cause the desired portion of the document to be re-displayed.

A placemark is created whenever the display of a current document is discontinued, i.e., by closing the document or navigating away from the document. In response to a discontinuation signal corresponding to the document currently being displayed, a placemark object comprising information linking the placemark object to a last-viewed part of the document is created. The placemark object is preferably created in a user space apart from the document being placemarked. If the placemarked document is subsequently selected for re-display, the last-viewed part of the document is initially re-displayed based on the information linking the placemark object to the document.

DETAILED DESCRIPTION OF THE INVENTION

Figure 1:
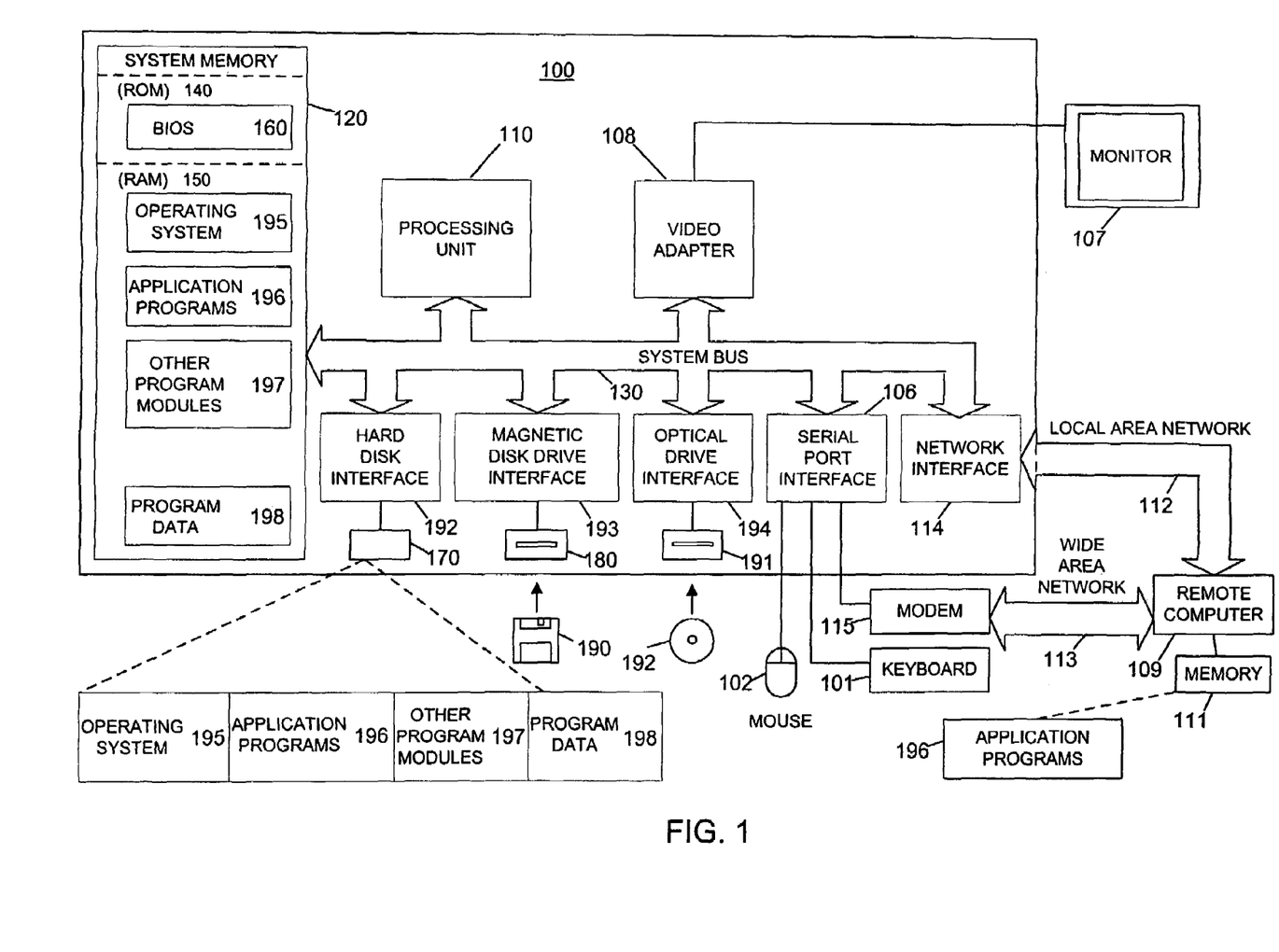
FIG. 1 is a schematic block diagram of a conventional general-purpose digital computing environment that may be used to implement various aspects of the present invention.

The present invention may be more fully described with reference to FIGS. 1-10. FIG. 1 is a schematic diagram of a conventional general-purpose digital computing environment (including handheld computing devices) that can be used to implement various aspects of the invention. Computer 100 includes a processing unit 110, a system memory 120 and a system bus 130 that couples various system components including the system memory to the processing unit 110. System bus 130 may be any of several types of bus structures including a memory bus or memory controller, a peripheral bus, and a local bus using any of a variety of bus architectures. System memory 120 includes a read only memory (ROM) 140 and a random access memory (RAM) 150.

A basic input/output system (BIOS) 160 containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment. It is anticipated that a handheld device implementing this invention would typically have only one mass storage peripheral, either a micro hard disk or else flash memory or equivalent.

A number of program modules can be stored on the hard disk, magnetic disk 190, optical disk 192, ROM 140 or RAM 150, including an operating system 195, one or more application programs 196, other program modules 197, and program data 198. A user can enter commands and information into computer 100 through input or selection devices, such as a keyboard 101 and a pointing device 102. The pointing device 102 may comprise a mouse, touch pad, touch screen, voice control and activation or other similar devices. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port or a universal serial bus (USB). A monitor 107 or other type of display device is also connected to system bus 130 via an interface, such as a video adapter 108. In addition to the monitor, personal computers typically include other peripheral output devices (not shown), such as speakers and printers. Preferably, any implementation of the present invention is designed to be operable in a least case scenario only by touch, and does not always require the use of a keyboard or mouse. As described in further detail below, a user may create a bookmark simply by touch, and accept the default labeling or modifies bookmark properties using touch techniques as well. But if he is using a device with keyboard, voice or handwriting recognition, for example, the user may use those input methods to create bookmarks and alter the properties of the bookmark.

Computer 100 can operate in a networked environment using logical connections to one or more remote computers, such as a remote computer 109. Remote computer 109 typically includes at least some of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet. It is anticipated that a handheld device used to implement the present invention would typically use a wireless LAN interface based on an infra-red or radio frequency communication link.

When used in a LAN networking environment, computer 100 is connected to local network 112 through a network interface or adapter 114. When used in a WAN networking environment, personal computer 100 and remote computer 109 may both include a modem 115 or other means for establishing a communications over wide area network 113, such as the Internet. Modem 115, which may be internal or external, is connected to system bus 130 via serial port interface 106. In a networked environment, program modules depicted relative to personal computer 100, or portions thereof, may be stored in the remote memory storage device.

It will be appreciated that the network connections shown are exemplary and other means of establishing a communications link between the computers can be used. The existence of any of various well-known protocols, such as TCP/IP, "ETHERNET", FTP, HTTP and the like, is presumed, and the system can be operated in a client-server configuration to permit a user to retrieve web pages from a web-based server. For example, in an embodiment of the present invention, the remote computer 109 is a server having stored thereon one or more documents that may be accessed by the computer 100.

Figure 2:
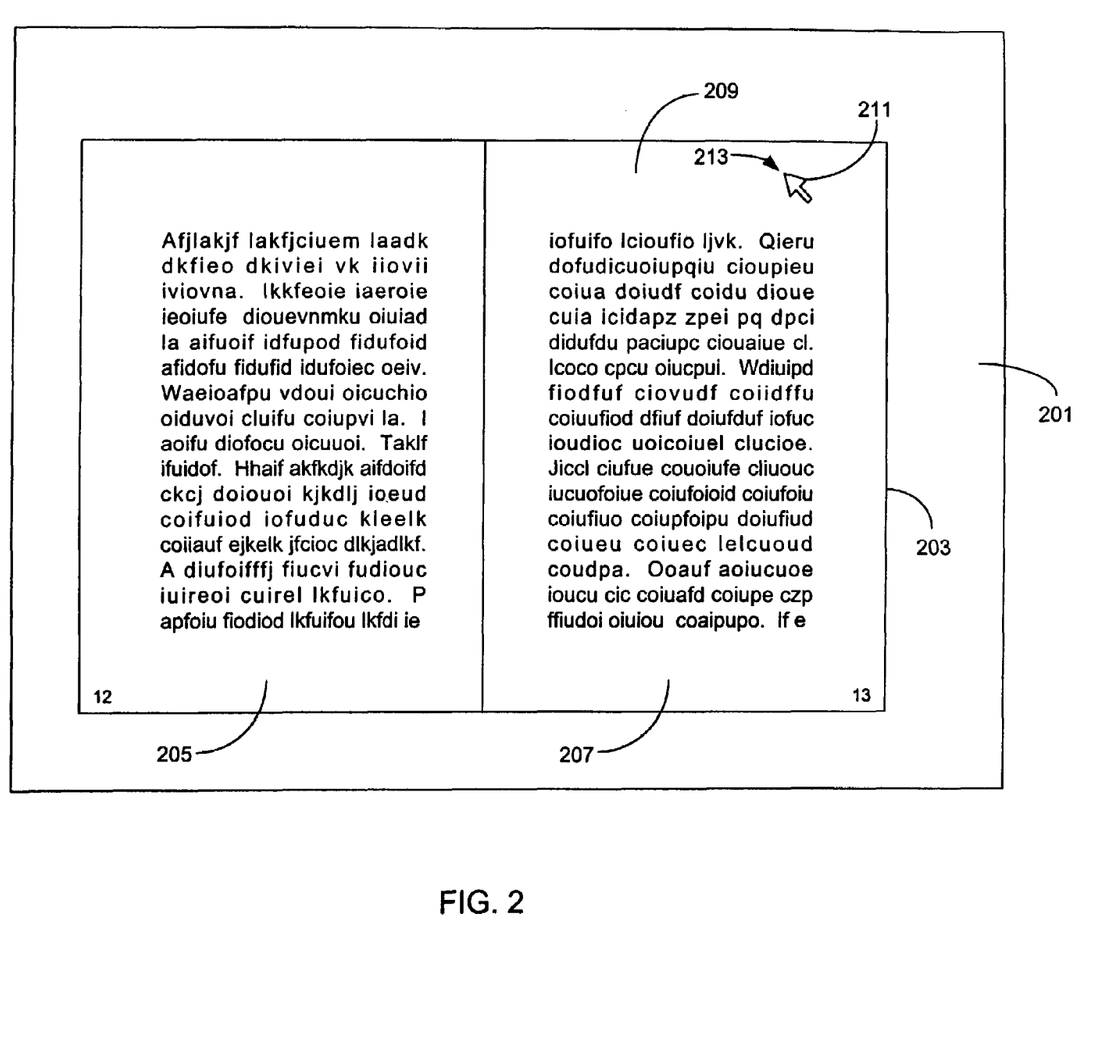
FIG. 2 illustrates an exemplary electronic display and a document displayed therein in accordance with the present invention.

FIG. 2 illustrates an electronic display 201 in accordance with the present invention. A computer monitor provides the display 201, sometimes referred to as a "screen". As shown in FIG. 2, the display 201 can be used to display a document 203. Various parts 205, 207 of the document 203 are also displayed; in this case, pages 12 and 13 of the document. Although the document 203 depicted in FIG. 2 is displayed in a book-like format, other display formats could also be provided. Each part of the document further comprises a predetermined region 209. In the example shown, the predetermined region 209 is a page margin, although other portions of the page could be designated as a predetermined region for the purposes of the instant invention. In the context of the present invention, the selection of any point within a predetermined region 209 will initiate the creation of a bookmark, as described below.

Additionally, a cursor 211 is shown. Positioning of the cursor 211 is controlled by a pointing device such as a mouse, touch pad, touch screen or similar devices. Although the cursor 211 is not required to practice the present invention, it is shown to illustrate the ability of a user to select various points and elements rendered on the display 201. For example, where a mouse controls the cursor 211, the user would maneuver the mouse until the cursor 211 points to a user-selected point 213 within the predetermined region 209. As known in the art, by "clicking" the mouse while the cursor 211 is pointing to the point 213, a selection signal is generated indicating that the user has selected the point 213. Alternatively, where a touch screen is used, a user need not control a position of a cursor, but may instead simply "tap" the screen at the selected point 213 in order to generate the selection signal. Regardless of the method used, the selection signal generated in this manner can be used to create a bookmark as described in greater detail below.

Figure 3:
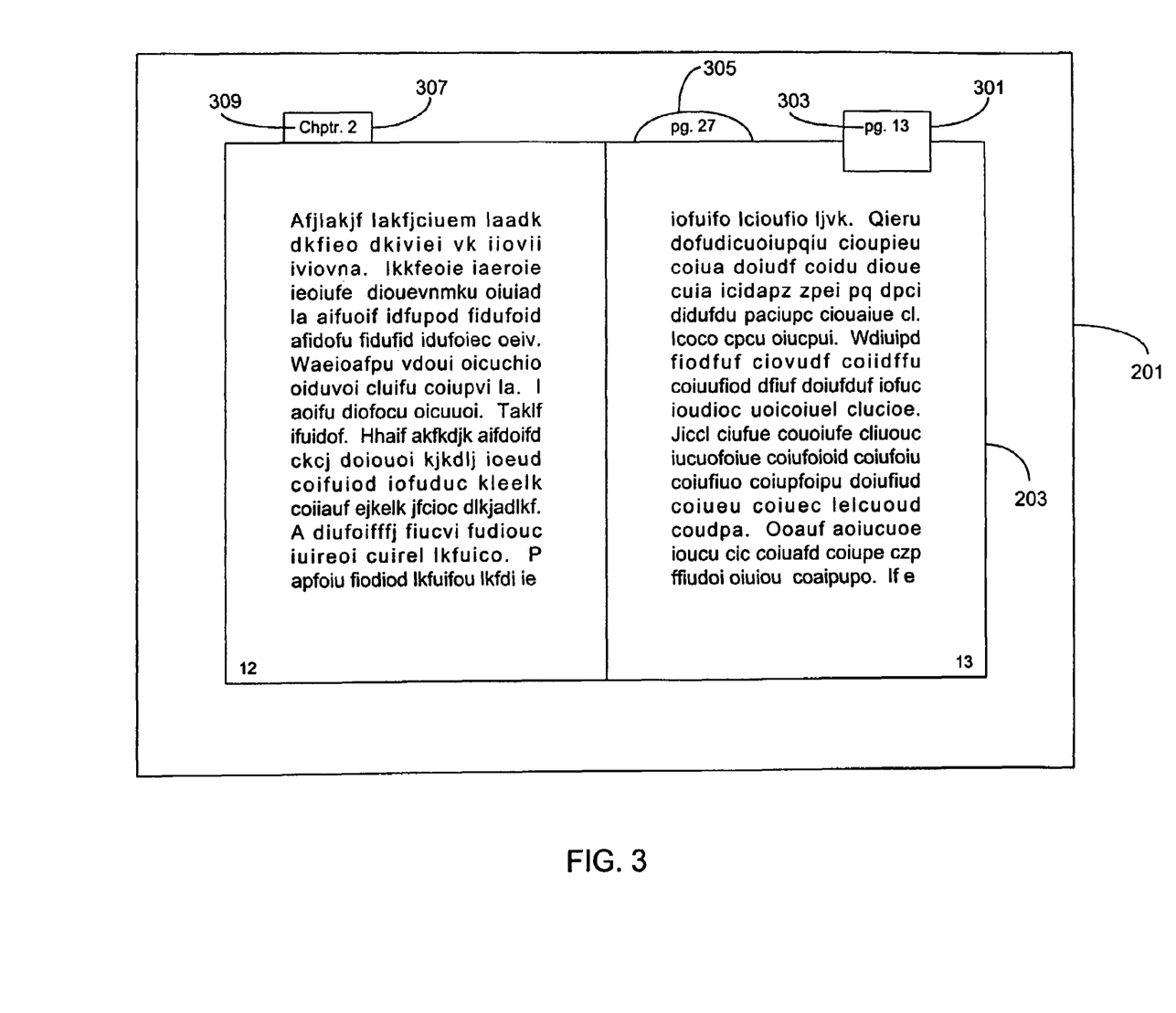
FIG. 3 illustrates exemplary features of bookmarks provided in accordance with the present invention.
Figure 4:
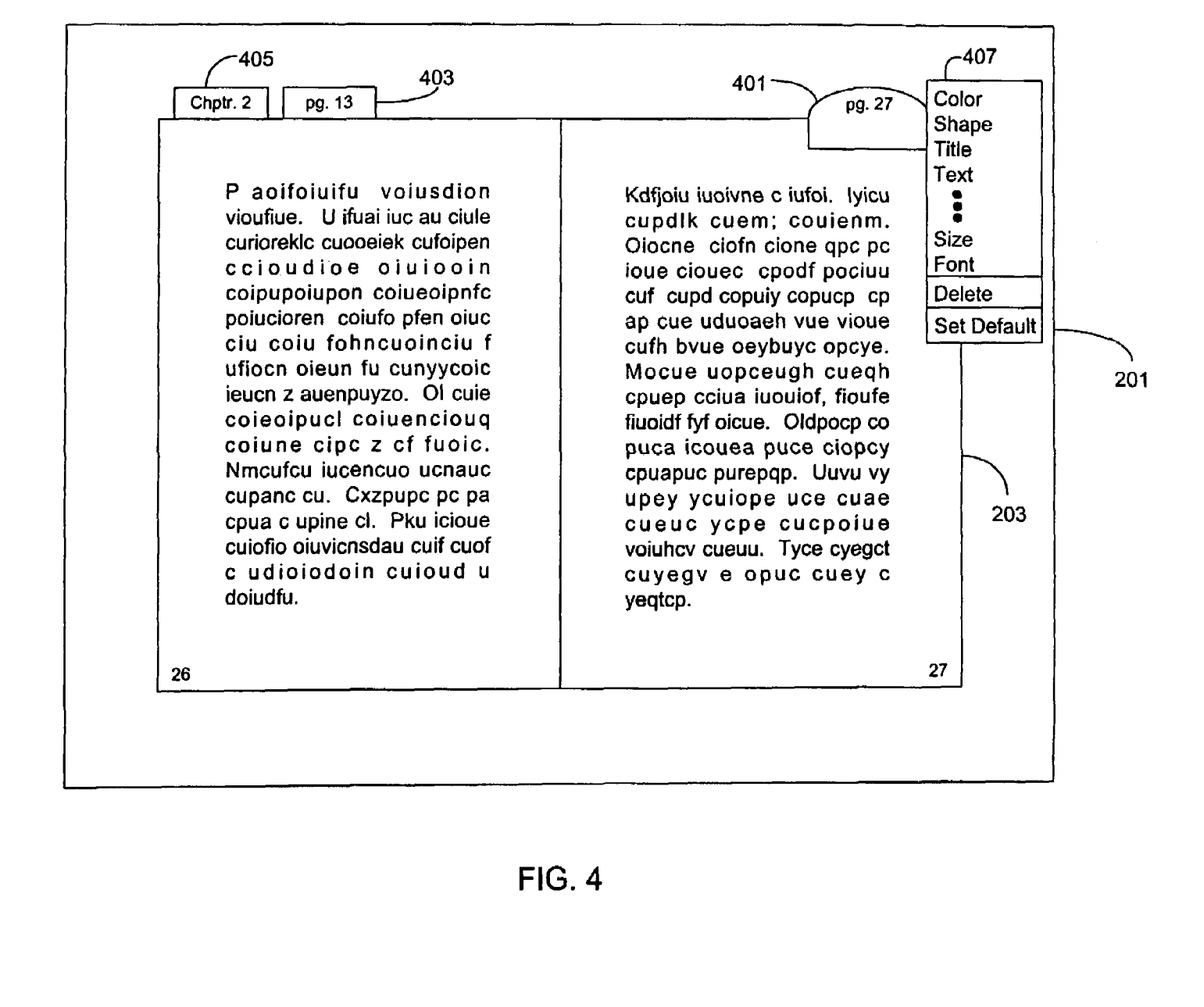
FIG. 4 illustrates further exemplary features of bookmarks provided in accordance with the present invention.

Referring now to FIG. 3, it is assumed that a selection signal has been generated corresponding to the user-selected point 213. In response to the selection signal, a visual indicator 301 is now displayed along with the desired part of the document, i.e., as an overlay. In one embodiment of the instant invention, the visual indicator 301 is positioned at the user-selected point 213. That is, the visual indicator 301 can be centered directly over the user-selected point 213, or merely vertically aligned with the user-selected point 213 and at a predetermined horizontal position. Alternatively, the visual indicator could be automatically positioned in response to the selection signal based on the existence of other visual indicators currently being displayed. In the example illustrated in FIG. 3, another visual indicator 305 is shown. If the selection signal would result in the new visual indicator 301 being displayed so as to obscure the other visual indicator 305, the computer currently rendering the display could automatically position the new visual indicator 301 away from the other visual indicator 305, or at least to minimize the amount of the other visual indicator 305 that would be hidden by the new visual indicator 301. Furthermore, although the visual indicators depicted in FIGS. 3 and 4 are shown along the top margin, they may be equally displayed virtually anywhere relative to the document being displayed. In one embodiment, the visual indicators are displayed along a vertical edge of the document being displayed, with the particular position of each bookmark in the document being signified by the vertical ordering of the visual indicators. For example, the uppermost visual indicator corresponds to a bookmark occurring at the lowest page in the document, and the bottommost visual indicator corresponds to a bookmark occurring at the highest page in the document, or vice versa. Other techniques, such as relative or increasing shading applied to the visual indicators, may be also used to signify positions within the document and are readily designed by those having ordinary skill in the art.

Each visual indicator may also comprise information identifying the desired part of the document that has been bookmarked. For example, the visual indicator 301 corresponding to the desired part of the document identified as "page 13" includes information 303 that identifies the part of the document marked by the visual indicator 301. The information identifying the desired part of the document can be automatically generated by the computer system, for example, using a page number, the first few words on the page or similarly useful information. The present invention also allows a user to enter a title or textual content 309 that can be displayed in place of, or in addition to, the information 303.

FIG. 3 also illustrates the ability to select different shapes of visual indicators used to represent bookmarks. For example, visual indicators could default to a rectangular shape as shown by those visual indicators identified by reference numerals 301 and 307. An alternative rounded shape is depicted for the visual indicator identified by reference numeral 305. Of course, a wide variety of shapes could be used limited only by design considerations and system resources.

Once a bookmark (as represented by its corresponding visual indicator) has been created, a user may access a different part of that document and later use the bookmark to return to the previously bookmarked part. For example, if a user selects the portion of the visual indicator having reference numeral 305, that part of the document marked by that bookmark will be displayed as shown in FIG. 4. Note that the selected visual indicator 401 is subsequently displayed in full when its corresponding part of the document is displayed. In contrast, the visual indicators 403, 405 corresponding to other parts of the document that were previously bookmarked are now only partially displayed, as shown.

As used in the context of the present invention, the "desired part of the document" generally encompasses that portion of the document, proximate the bookmark, capable of display on a single computer screen. For example, some document may include predefined internal boundaries, such as pages, which correspond to display boundaries when the document is being displayed. This is illustrated in FIGS. 2-4. In this case, the internal boundaries encompassing the bookmark delimit the extent of the desired part of the document. Other documents, such as web pages, may not necessarily include such internal boundaries. In this case, "the desired part of the document" comprises those portions of the document capable of being simultaneously displayed with the bookmark. For example, where a web page is marked, the desired part of the document includes those portions of the web page that are viewable so long as the visual indicator of the bookmark is likewise viewable.

The present invention also provides for the manipulation of user-modifiable properties. User-modifiable properties are any parameters that may be modified by a user that affect the appearance of visual indicators, or in any way control the operation of bookmarks in accordance with the present invention. For example, FIG. 4 illustrates a context menu 407 comprising a variety of exemplary menu selections applicable to a selected visual indicator 401. Access to the context menu 407 is provided using known techniques, such as using a predefined mouse button. Other techniques for displaying and manipulating a context menu (e.g., touch screens, voice control and activation, etc.) may also be used.

The menu selections correspond to properties that may be modified by a user or actions that may be taken by the user relative to the selected visual indicator 401. As mentioned above, the present invention allows a user to select a shape, title or textual content for a given visual indicator. A variety of other properties of the selected visual indicator may also be manipulated, including color, size, texture, font, and placement. The context menu also comprises menu selections allowing a user to perform certain actions relative to the selected visual indicator, such as deleting the visual indicator and specifying default settings. The user may even wish to add links to other locations in this or other documents as part of a bookmark. Other suitable properties and actions may be evident to those having ordinary skill in the art, and the present invention is not limited in this regard by those properties and action listed above.

Figure 5:
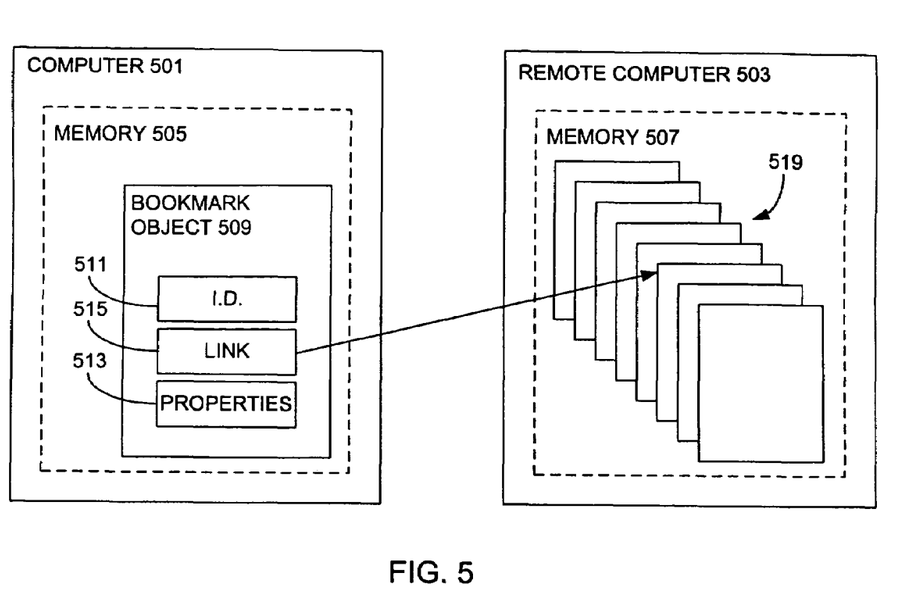
FIG. 5 is a schematic block diagram illustrating a bookmark object and its relationship to a document in accordance with the present invention.
Figure 6:
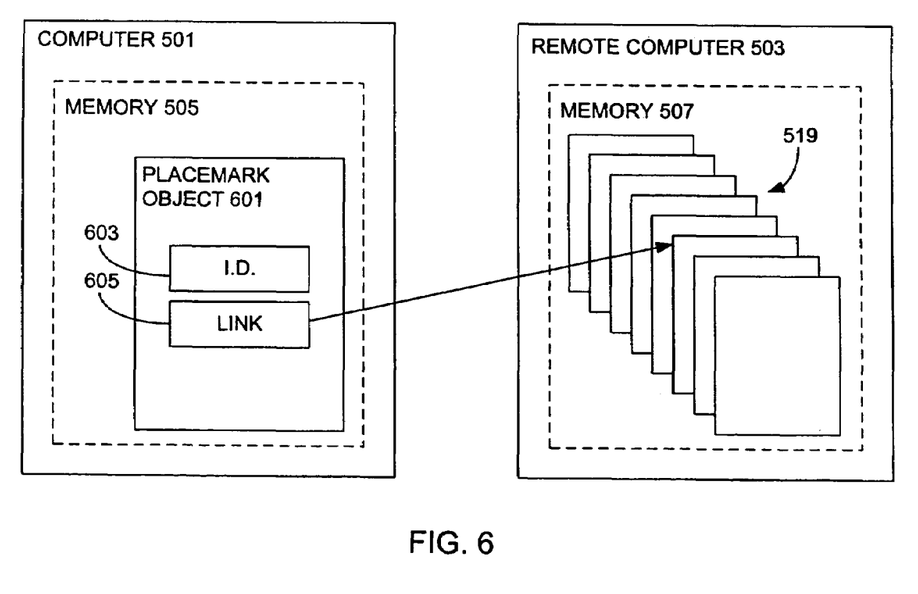
FIG. 6 is a schematic block diagram illustrating a placemark object and its relationship to a document in accordance with the present invention.

FIGS. 5 and 6 illustrate the relationship of a bookmark object and a placemark object, respectively, to a document in accordance with the present invention. In particular, both FIG. 5 and FIG. 6 show a computer 501 and remote computer 503 that may comprise computers in accordance with the computer 100 shown in FIG. 1. Each computer 501, 503 comprises memory 505, 507 as known in the art. As described in greater detail below, a bookmark object 509 is created each time a bookmark is added to a document. Similarly, a placemark object 601 is created whenever a placemark is added to a document. A bookmark or placemark "object" in the context of the present invention comprises at least a computer-readable data structure stored on one or more electronic storage devices.

In the example shown, the memory 507 of the remote computer 503 comprises at least one electronic document 519. Although it is possible to store the bookmark/placemark objects in the same storage device as the document(s) being marked, bookmark and placemark objects are preferably created in a user space apart from the document being marked. This is illustrated in FIGS. 5 and 6 where the bookmark object 509 and placemark object 601 are resident in a computer apart from the document 519 being marked. The "user space" used to store the bookmark and/or placemark objects is not restricted to any particular physical configuration, such as memory resident on a single computer. A "user space" encompasses any electronic storage device or devices that is (are) capable of storing a bookmark/placemark object and that is accessible by a given user. Thus, conventional storage devices such as floppy disks, memory cards, etc. may be used in addition to hard drives to store the bookmark/placemark objects. Although it is preferred that the user space be separate from the storage device used to store the document, the present invention does not preclude the user space and the document storage device being resident on the same computer. Referring to FIGS. 5 and 6, this would be the case where the memory 507 storing the document 519 is resident in the computer 501, separate but in addition to the memory 505 storing the bookmark/placemark object 509, 601. For example, the document 519 could be stored on a memory card plugged into a user's computer, with the bookmark object 509 residing in local memory.

The bookmark object 509 comprises information 511 identifying the desired part of the document being marked. As discussed above, this information can be, for example, a page number or the first few words displayed in the desired part of the document or a default identification assigned when the bookmark object 509 is created. Regardless of its particular form, the identifying information allows the computer displaying the document to properly manage the display of the visual indicator representative of the bookmark object, e.g., when the desired part is not being displayed, displaying only a portion of the corresponding visual indicator.

The bookmark object 509 also comprises user-modifiable properties 513, discussed above. When the bookmark object 509 is initially created, the properties 513 are preferably initialized to a default set of values. The default values can be subsequently modified using techniques similar to those described above.

The bookmark object 509 further comprises information 515 linking the bookmark object 509 to the document being marked. Suitable linking information 515 comprises any information that is used to persistently link two or more objects across storage device, computer and/or network boundaries, as known in the art. The information 515 linking the bookmark object 509 may comprise, for example, a hyperlink or similar mechanism that uniquely identifies the document being marked and, preferably, the particular part (i.e., page, screen, line number, chapter, paragraph number, etc.) of the document being marked. Although it is not preferred, the bookmark object 509 could be stored integrally as part of the document being marked, thereby eliminating the need for the linking information 515 altogether. Storing bookmarks separately from the document allows users to bookmark information that they have no ability to modify—for example, bookmarking a document that is stored on a CD ROM, or content stored on a website. Externally stored bookmarks can also be shared with other users so that, for example, when a first user mails another user the first user's "copy" of a book (in fact a link to the book), copies of the first user's personal bookmarks can be sent as well so that the receiving user can see the first user's bookmarks. Furthermore, external storage of bookmarks may also allow the user to select (i.e., to examine and/or sort) bookmarks from an index or list of bookmarks in different ways according to selection criteria encompassing various properties of the bookmarks. For example, a user may choose to view/sort all bookmarks from a certain document, all bookmarks created on a certain day, all bookmarks where the user entered non-default text, etc. Techniques for examining and sorting data such as a list of bookmarks are well known in the art.

The placemark object 601 is similar in structure to the bookmark object 509 except that it does not include anything analogous to the user-modifiable properties 513. The linking information 605 is equivalent in function and structure to its counterpart described above relative to the bookmark object 509. Although structurally similar to its counterpart in the bookmark object 509, the identifying information 603 instead corresponds to a last-viewed part of the document, i.e., that part of the document that was being displayed when an indication was received that the document is to no longer be displayed. The "last-viewed part of the document", similar to the "desired part of the document", generally encompasses that portion of the document, proximate the placemark, capable of display on a single computer screen. As such, the discussion provided above regarding the presence or absence of internal boundaries within the document equally applies in the context of the last-viewed part of the document. The manner in which bookmark objects and placemark objects are created, used and removed is substantially different, as discussed below with regard to FIGS. 7-10.

Figure 7:
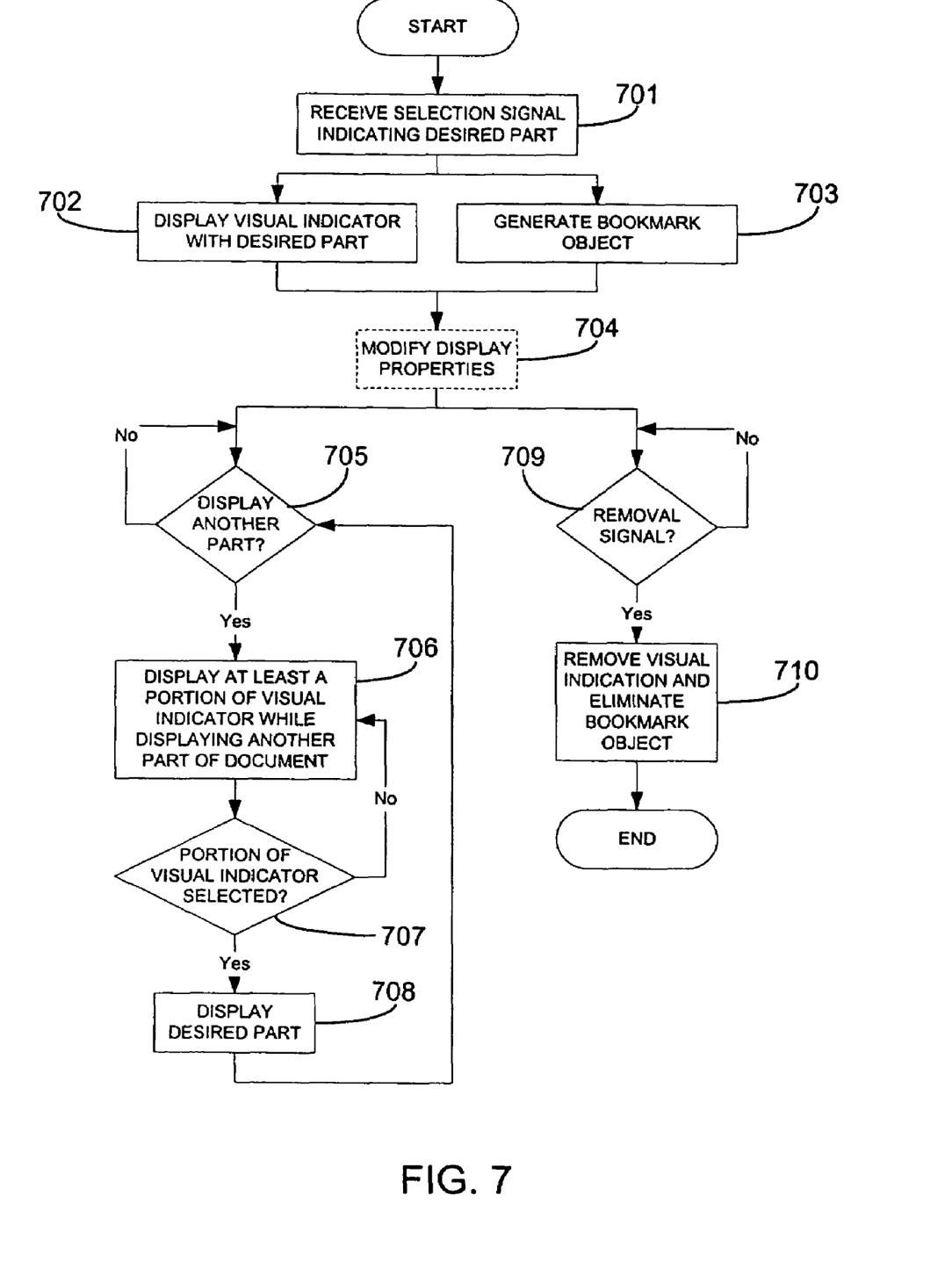
FIG. 7 is a flowchart illustrating a method for the creation, use and removal of a bookmark in accordance with the present invention.

FIG. 7 is a flow chart illustrating the operation of bookmarks in accordance with the present invention. The method of FIG. 7 can be executed as steps on a computer, such as the computer 100 shown in FIG. 1, using well-known programming techniques. At step 701, a selection signal is received that indicates a desired part of a document being displayed that a user wishes to bookmark. As described above, a variety of ways exist for providing such a selection signal, and it is not critical to the operation of the present invention. In response to the selection signal, at step 702, a visual indicator is rendered on the display that is currently displaying the document being marked. At step 703 and substantially contemporaneously with step 702, a bookmark object is also generated. Techniques for rendering visual indicators and generating objects as required by the present invention are well-known in the art and are not described in further detail here. The visual indicator of step 702 is representative of and logically linked to the bookmark object of step 703; together, the visual indicator and bookmark object provide the bookmark functionality of the present invention. As noted above, the bookmark object created at step 703 is preferably initialized such that the user-modifiable properties comprise default values. Such default values may be "hard coded" or adjustable by a user. Regardless, a user may optionally alter the display properties at step 704 using a context menu or similar mechanism, as described above.

As described above, the processing of steps 702 and 703 occurs automatically in response to the select signal. However, it is anticipated that reception of the selection signal may actually be a precursor to any of a number of possible user actions, with the establishment of a bookmark being but one of the several possible actions. For example, the user may wish to annotate the document using another method other than bookmarks. In this case, before steps 702 and 703 are carried out, the user is first presented with a choice of which action they would like to perform.

After the bookmark has been created, a user at any time (while the document continues to be displayed) may elect, at step 705, to display another part of the document, for example, by selecting another page. If another part of the document is to be displayed, processing continues at step 706 where at least a portion of the visual indicator (created at step 702) continues to be displayed even though the other part of the document is now being displayed. This is illustrated in FIG. 3 by those visual indicators having reference numerals 305 and 307 and in FIG. 4 by those visual indicators having reference numerals 403 and 405.

At step 707, it is determined if another selection signal has been received indicating the selection of the portion of the visual indicator being displayed as a result of step 706. Referring again to FIG. 3, for example, such a selection signal would be received if a user were to select visual indicator having reference numeral 305, corresponding to the user's desire to now display that part of the document, i.e., page 27. In response to the selection signal received at step 707, the desired part of the document that was marked at steps 701-703 is re-displayed at step 708. Continuing with the previous example and referring now to FIG. 4, the desired part of the document (page 27) is now displayed after its corresponding visual indicator was selected. Processing thereafter continues at step 705.

Steps 709 and 710 may be executed substantially contemporaneously with steps 705-708. At step 709, it is determined whether a removal signal corresponding to a bookmark has been received. Using the selection device in a manner similar to that described above (e.g., activating the display of a context menu using a mouse and cursor, touch screen, voice activation, etc.), the removal signal corresponds to a given bookmark as defined by its visual indicator and bookmark object. A removal signal manifests a user's desire to remove a bookmark from a document. Thus, at step 710, the corresponding visual indicator is removed and the bookmark object is eliminated responsive to the removal signal. Once again, techniques for removing a visual indicator and eliminating an object are well-known and are not described in further detail herein.

Figure 8:
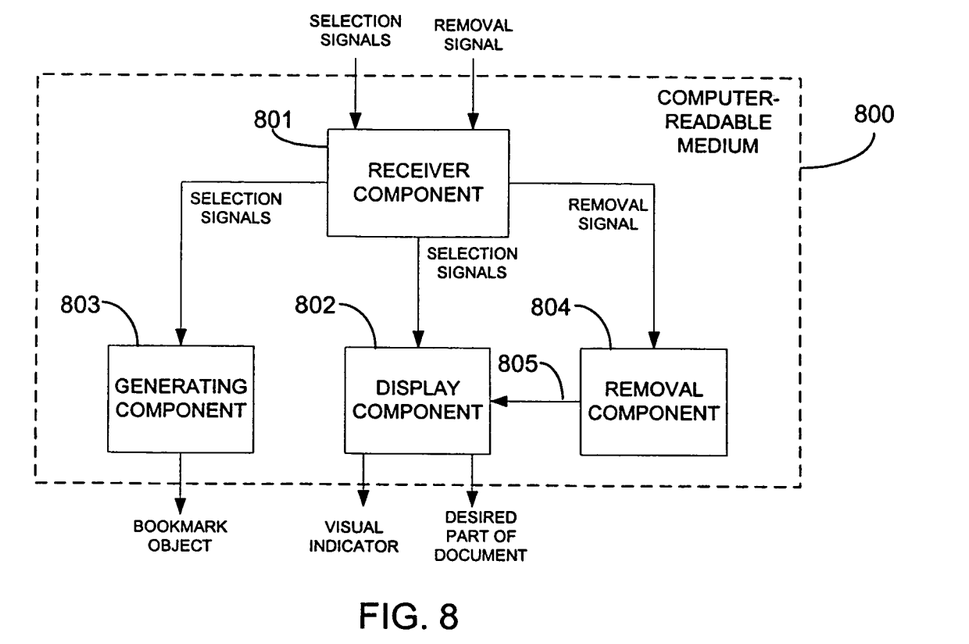
FIG. 8 is a schematic block diagram of an implementation of the present invention based on a computer-readable medium.

An implementation of the bookmarking functionality of the present invention is schematically illustrated in FIG. 8. In particular, a computer-readable medium 800 (such as RAM, ROM, floppy disc, memory card, etc.) comprising a receiver component 801, a display component 802, a generating component 803 and a removal component 804 is shown. Each of the components preferably comprises computer-executable instructions. As those having ordinary skill in the art will readily appreciate, various other component arrangements can be devised that encompass the same functionality.

The receiver component 801 takes as input the selection signals and removal signals described above and routes them to the appropriate components. Thus, a selection signal reflecting a user's desire to create a bookmark is routed to the display component 802 and generating component 803 resulting in a visual indicator and bookmark object, respectively. Likewise, a selection signal corresponding to a portion of a visual indicator is routed to the display component 802, thereby causing a previously-marked portion of the document to be displayed. Removal signals are routed to the removal component 804 that causes, in turn, the visual indictor to be removed (depicted by the control connection 805) and the bookmark object to be eliminated.

Figure 9:
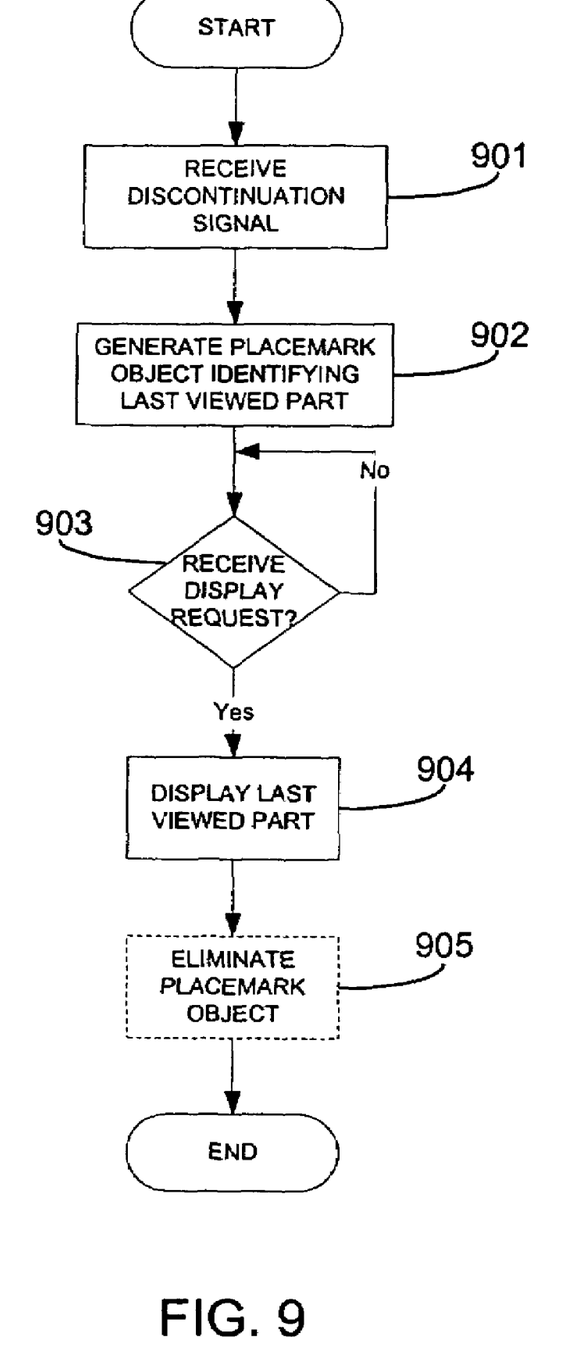
FIG. 9 is a flowchart illustrating a method for the creation, use and removal of a placemark in accordance with the present invention.

FIG. 9 is a flow chart illustrating the operation of placemarks in accordance with the present invention. The method of FIG. 9 can be executed as steps on a computer, such as the computer 100 shown in FIG. 1, using well-known programming techniques. At step 901, a discontinuation signal is received. For example, a user may close the currently-displayed document or reduce it to an iconic representation. Further still, a user may simply navigate to a different document while leaving the currently-displayed documents open. Regardless, the discontinuation signal indicates that a currently-displayed document is to no longer be displayed, or is to be obscured partially or entirely in the display. In response to the discontinuation signal, at step 902, a placemark object comprising information identifying a last-viewed part of the document is generated. Techniques for generating objects as required by the present invention are well-known in the art and are not described in further detail here. As noted above, the bookmark object created at step 902 comprises information linking the placemark-object to the document being marked, as well as information identifying the last-viewed part of the document.

After the placemark has been created, a user at any time may cause a display request signal to be received at step 903. The display request signal corresponds to the document that was previously displayed and is essentially the inverse of the discontinuation signal. That is, the display request signal indicates that the previously-closed document is being re-opened and re-displayed, or expanded from an iconic representation. Alternatively, the display request signal can indicate that a document that was previously obscured is now being displayed without any portion hidden. Regardless, if the display request signal is received, then, at step 904, the last-viewed part of the document (identified by the placemark object) is displayed.

Also, at step 905, the placemark object may be optionally eliminated no earlier than the step of the last-viewed part of the document being re-displayed. Elimination of the placemark object need not be performed automatically when the last-viewed part is re-displayed. For example, the placemark object may be retained so long as nothing other than the last-viewed portion of the document is displayed before the document is again closed or otherwise subject to another discontinuation signal. Stated another way, the placemark object may be eliminated only when another part of the document (other than the last-viewed part) is displayed after the document has been re-displayed. Once again, techniques for eliminating an object are well-known and are not described in further detail herein.

Figure 10:
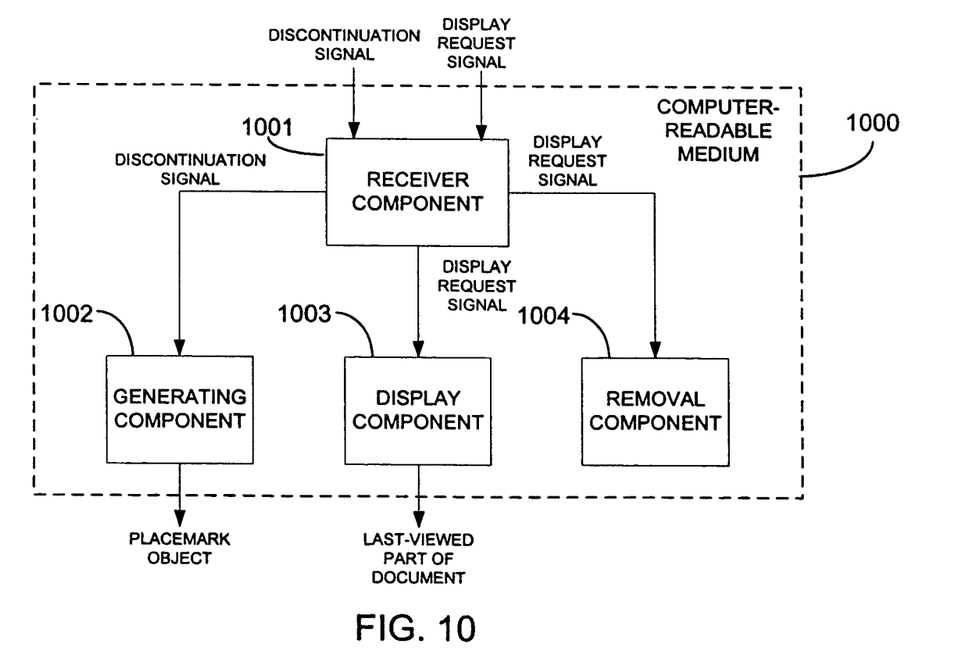
FIG. 10 is a schematic block diagram of another implementation of the present invention based on a computer-readable medium.

An implementation of the placemarking functionality of the present invention is schematically illustrated in FIG. 10. In particular, a computer-readable medium 1000, such as RAM, ROM, floppy disc, memory card, etc. comprising a receiver component 1001, a generating component 1002, a display component 1003 and a removal component 1004 is shown. Each of the components preferably comprises computer-executable instructions. As those having ordinary skill in the art will readily appreciate, various other component arrangements can be devised that encompass the same functionality.

The receiver component 1001 takes as input the discontinuation signals and display request signals described above and essentially re-routes them to the appropriate components. Thus, a discontinuation signal reflecting the need to create a placemark is routed to the generating component 1002 resulting in a placemark object. Likewise, a display request signal corresponding to a document previously subject to a discontinuation signal is routed to the display component 1003, thereby causing a last-viewed portion of the document to be re-displayed. Additionally, the display request signal is also routed to the removal component 1004 that causes, in turn, the bookmark object to be eliminated.

What has been described is merely illustrative of the application of the principles of the present invention. Other arrangements and methods can be implemented by those skilled in the art without departing from the spirit and scope of the present invention.

What is claimed is:

1. A computer-readable storage medium having stored thereon at least one bookmark object and a display component, which when executed by a machine displays a visual indicator at least partially outside of a document in response to a user selecting a desired part of the document, the at least one bookmark object comprising:
   a first data storage comprising information linking the bookmark object to a document,
   a second data storage comprising information identifying a user-selected part of the document being marked by the bookmark object, and
   a third data storage comprising information regarding user-modifiable properties of a visual indicator corresponding to the bookmark object; and
   said display component causing a display device to display the visual indicator at least partially outside of the document in association with the user-selected part of the document.

2. The computer-readable storage medium of claim 1, wherein the user-defined part of the document being marked comprises a desired part of the document.

3. The computer-readable storage medium of claim 1, wherein the first data storage comprises a hyperlink.

4. The computer-readable storage medium of claim 1, wherein the information regarding user-modifiable properties comprises information defining at least one of: a color of the visual indicator, a shape of the visual indicator, a font of the visual indicator, a title of the visual indicator and textual content of the visual indicator or links to other locations.

5. The computer-readable storage medium of claim 1, wherein the document is stored on the computer-readable storage medium.

6. A computer comprising the computer-readable storage medium of claim 1 and another computer-readable storage medium, wherein the document is stored on the other computer-readable storage medium.

7. A computer comprising the computer-readable storage medium of claim 1 and coupled to a remote computer-readable storage medium, wherein the document is stored on the remote computer-readable storage medium.

8. A computer-readable storage medium having stored thereon a bookmark object for an associated visual indicator created in response to selection of a desired part of a document, the visual indicator to be displayed partially outside of the document, the bookmark object when executed by a computer performs steps of:
   for the desired part of the document, generating an instance of the bookmark object comprising first, second, and third data storage;
   storing into the first data storage information linking the bookmark object to the document;
   storing into the second data storage information identifying the desired part of the document being marked by the bookmark object; and
   storing into the third data storage information regarding user-modifiable properties effecting display of the visual indicator corresponding to the bookmark object.

9. The computer-readable storage medium of claim 8, wherein the user-defined part of the document being marked comprises a desired part of the document.

10. The computer-readable storage medium of claim 8, wherein the first data storage comprises a hyperlink.

11. The computer-readable storage medium of claim 8, wherein the information regarding user-modifiable properties comprises information defining at least one of: a color of the visual indicator, a shape of the visual indicator, a font of the visual indicator, a title of the visual indicator and textual content of the visual indicator or links to other locations.

12. The computer-readable storage medium of claim 8, wherein the document is stored on the computer-readable storage medium.

13. A computer comprising the computer-readable storage medium of claim 8 and another computer-readable storage medium, wherein the document is stored on the other computer-readable storage medium.

14. A computer comprising the computer-readable storage medium of claim 8 and coupled to a remote computer-readable storage medium, wherein the document is stored on the remote computer-readable storage medium.

* * * * *